E. GORE.
Butter Worker.

No. 11,370.

Patented July 25, 1854.

UNITED STATES PATENT OFFICE.

EZEKIEL GORE, OF BENNINGTON, VERMONT.

BUTTER-WORKER.

Specification of Letters Patent No. 11,370, dated July 25, 1854.

*To all whom it may concern:*

Be it known that I, EZEKIEL GORE, of Bennington, in the county of Bennington and State of Vermont, have invented a new and useful Improvement in Butter-Workers; and I do hereby declare that the following is a full, clear, and exact description of the same, reference being had to the accompanying drawings, forming part of this specification, in which—

Figure 1:
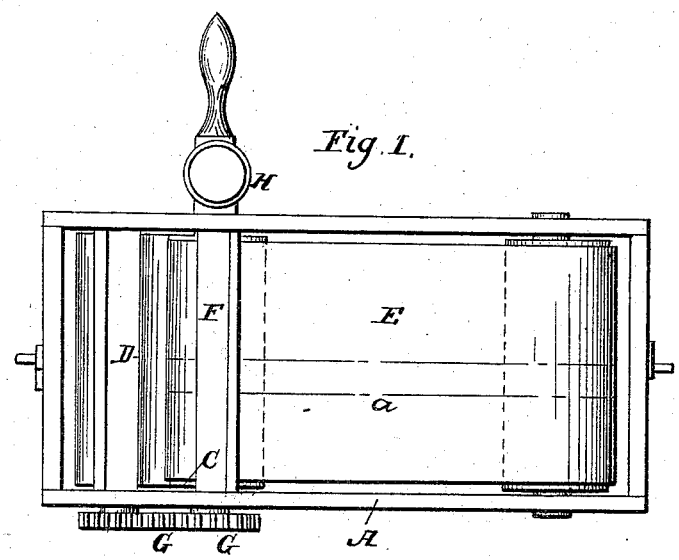
Figure 2:
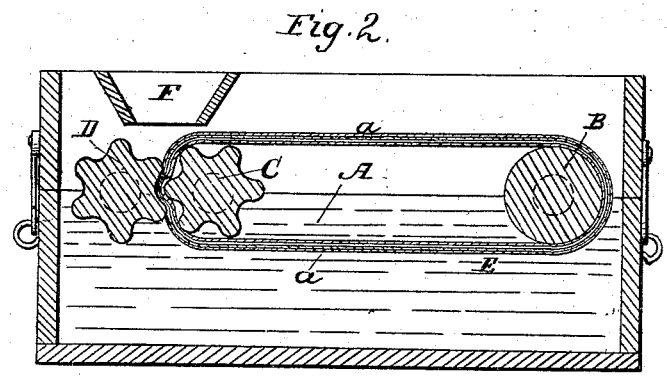

Figure 1, is a plan or top view of one of my improved butter workers. Fig. 2, is a vertical longitudinal section of the same.

Similar letters of reference in each of the several figures indicate corresponding parts.

The nature of my invention consists in the employment of an endless revolving sack or bag for containing and confining the butter, and conveying it to, and between two fluted or working rollers, and through the water in the tub or box as fast as the rollers operate upon it, until it is thoroughly worked, washed, and seasoned.

To enable others skilled in the art to make and use my invention, I will proceed to describe its construction and operation.

A, represents the box or tub which contains the water for washing the butter, and also supports the bearings of the rollers B, C, D. The box A, is made in two sections, so that its upper part may be removed, and also the rollers and sack when it is desired to cleanse the lower part. The roller B, is made perfectly smooth, and has its bearing at the back end of the machine, and the roller C, is fluted, as shown, and has its bearings near the front end of the machine. On and around these rollers, the sack E, is arranged, as represented. The roller, D, is fluted similar to C, and operates in concert with it, but is prevented from touching it by the sack which is placed and revolves between it, as illustrated.

The sack carries the butter between the fluted rollers; and said rollers, as the butter passes between them, effectually operating upon it, and working it to the state desired.

F, is a hopper, arranged above the fluted rollers, as represented; through this hopper, the salt is introduced between said rollers which work it into the butter as the sack feeds it between them.

The sack E, has two openings, *a, a*, for the insertion and removal of the butter. The butter cannot escape out of said openings while the working and washing is being performed as the cloth forming the bag is made to over and under lap at the places where the openings are formed, as illustrated by the red lines.

G, G, represent cog gearing for turning the fluted rollers in opposite directions. H, is a crank for turning the same.

The operation is as follows:—The butter is placed in the sack and the tub filled with water; the fluted rollers are caused to revolve, and as they revolve, they set the sack in motion. The sack and the butter are thus caused to pass between the fluted rollers under the salt hopper, and then through the water until thoroughly worked, cleansed and seasoned.

This machine operates well, and has been found to be well adapted for the purpose herein stated. It can be more easily operated than other machines in use, and the butter more speedily worked, cleansed, and seasoned by it.

What I claim as my invention, and desire to secure by Letters Patent, is:—

A machine provided with an endless revolving sack, and having its parts arranged and operating essentially as herein described and shown, for working, cleansing, and seasoning butter, substantially as set forth.

EZEKIEL GORE.

Witnesses:
JOHN CUSHMAN,
J. HALSEY CUSHMAN.